US010467507B1

(12) United States Patent
Hao et al.

(10) Patent No.: US 10,467,507 B1
(45) Date of Patent: Nov. 5, 2019

(54) IMAGE QUALITY SCORING (71) Applicant: Amazon Technologies, Inc., Seattle, WA (US)

(72) Inventors: Xiang Hao, Kenmore, WA (US); Yi Sun, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 15/491,804

(22) Filed: Apr. 19, 2017

(51) Int. Cl.
*G06K 9/64* (2006.01)
*G06K 9/62* (2006.01)
*G06K 9/66* (2006.01)

(52) U.S. Cl.
CPC ............ *G06K 9/6277* (2013.01); *G06K 9/66* (2013.01); *G06K 2209/27* (2013.01)

(58) Field of Classification Search
CPC .... H04N 5/23222; G06K 9/00; G06K 9/6255; G06K 9/0014; G06K 9/344; G06K 2209/01; G06K 2209/21; G06K 2009/00738; G06K 2009/3291
See application file for complete search history.

(56) References Cited

U.S. PATENT DOCUMENTS

| | | | | |
|---|---|---|---|---|
| 6,816,847 B1* | 11/2004 | Toyama | ................. | G06K 9/00 382/156 |
| 7,412,075 B2* | 8/2008 | Kondo | .................. | H04N 5/272 348/E5.058 |
| 8,090,222 B1* | 1/2012 | Baluja | ................ | G06F 16/5838 382/305 |
| 8,897,604 B2* | 11/2014 | Deng | .................... | G06T 7/0002 382/305 |
| 8,977,629 B2* | 3/2015 | Goswami | ............... | G06Q 30/02 707/748 |
| 10,218,901 B2* | 2/2019 | Hao | ......................... | G06T 7/70 |
| 2003/0210819 A1* | 11/2003 | Spinat | ................... | G06F 16/954 382/201 |
| 2004/0264774 A1* | 12/2004 | Anisimovich | ..... | G06K 9/00456 382/173 |
| 2005/0089246 A1* | 4/2005 | Luo | ..................... | G06K 9/00268 382/286 |
| 2005/0111737 A1* | 5/2005 | Das | ......................... | G06F 16/54 382/190 |
| 2006/0119879 A1* | 6/2006 | Nakai | ................ | H04N 1/00846 358/1.14 |
| 2008/0285092 A1* | 11/2008 | Curtis | ................ | H04N 1/32101 358/474 |

(Continued)

OTHER PUBLICATIONS

Rating Image Aesthetics using Deep Learning, Xin Lu et al., IEEE, 1520-9210, 2015, pp. 2021-2034 (Year: 2015).*

*Primary Examiner* — Jayesh A Patel
(74) *Attorney, Agent, or Firm* — Lee & Hayes, P.C.

(57) ABSTRACT

An image quality assessment solution analyzes an image quality and a correlation of an image to an item description associated with the item. The content quality assessment may assign a quality score to the image based on a composition of the image and/or correlation with the image description. The score may be based on a model that is trained to analyze images using a learning model. Based on the image score, a correlation score, or other scores, the user may be given feedback on how to improve an image. A service provider providing this service may use the score to influence recommendation results that use the images.

20 Claims, 5 Drawing Sheets

(56) References Cited

U.S. PATENT DOCUMENTS

| | | | |
|---|---|---|---|
| 2009/0208064 A1* | 8/2009 | Cambier | G06K 9/0061 |
| | | | 382/110 |
| 2010/0086189 A1* | 4/2010 | Wang | G06T 5/00 |
| | | | 382/132 |
| 2010/0092036 A1* | 4/2010 | Das | G06K 9/3241 |
| | | | 382/103 |
| 2011/0235910 A1* | 9/2011 | Soceanu | G06K 9/00295 |
| | | | 382/173 |
| 2012/0128239 A1* | 5/2012 | Goswami | G06T 7/0002 |
| | | | 382/162 |
| 2013/0173524 A1* | 7/2013 | Hueter | G06Q 10/04 |
| | | | 706/50 |
| 2015/0206034 A1* | 7/2015 | Park | G06F 16/5854 |
| | | | 382/195 |
| 2015/0213612 A1* | 7/2015 | Lin | G06F 16/5838 |
| | | | 382/173 |
| 2017/0374246 A1* | 12/2017 | Wang | H04N 5/23222 |
| 2018/0041692 A1* | 2/2018 | Qin | H04N 5/23216 |

* cited by examiner

IMAGE QUALITY SCORING

BACKGROUND

The wide availability of mobile devices that include cameras has made it easy for users to take pictures. Similarly, online technologies have made it easy for users to list an item on an online marketplace. In a short amount of time, a user can upload a photo and provide an item description, and thus be transformed into an entrepreneur. Without coaching, inexperienced users often post poor quality images of items. The images may feature irrelevant items, poor lighting, or composure from poor angles, a low contrast background, and/or other attributes that make the image undesirable.

Some service providers set guidelines for images, such as specifying that image background be white. Although a service provider may post the image guidelines, a user may submit images that do not adhere to the guidelines or provide the incorrect descriptions for the items depicted in the images. Due to the sheer volume of listings submitted, the current solution for image quality control which relies on manual reviews or feedback submit by other users, may not be sufficient for a large marketplace.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to leveraging an image scoring solution to enhance the quality of images used to represent items. A service provider may receive images and user-generated item descriptions from users. Before publishing the items, via the images and descriptions, the service provider may provide feedback on the image quality based on the image scoring solution. In at least one example of an image scoring solution, the service provider may train a learning model to provide an automated image scoring solution to provide timely feedback on the images based on the image scores. In some embodiments, the image scores may be associated with the images of marketplace listings to aid the service provider, and the user, on providing better search results and better product information to end customer. By scoring images, and then updating or receiving better images in place of low scoring images, the service provider and user may create a better customer experience by not only providing higher quality images, but also providing images that more accurately reflect the item descriptions.

In various embodiments, the service provider may train a neural network model or other possible models to extract one or more composition rules to detect image quality and apply the composition rule(s) to classify an image as having good or bad quality, which may be represented by a score or by other information. When the service provider receives an image and item description from a user, the service provider may perform image analysis to identify the object in the image and determine if there is a strong correlation between the identified object and the item description. The service provider may score each image based on the composition rule(s) and generate an image score to be associated with the image, possibly logged as part of the data structure for the image. The service provider may also adjust the score or generate another score based on the correlation of the image to item description. In some embodiments, a strong correlation may have little effect on the image score, but a poor correlation may decrease the score significantly. For example, an image of a pair of shoes with an item description of "Classic Red Tricycle" may receive a low score even if the image of the shoes is otherwise a high-quality image with good image composition.

The image score may guide the service provider to provide a user with one or more suggestions to upload a new higher quality image if the score for the current submitted image is below an image quality threshold. For illustrative purposes, the one or more suggestions for image score improvement may be related to, but are not limited to, lighting, background, zoom, crop, focus, angle, and item description for the image. in various embodiments, the service provider may provide an edit tool to perform the edits on the received image.

In some embodiments, the service provider may retrieve a selection of stock images for the merchant to use in place of the user submitted image. For example, a stock image may be retrieved based on the stock image having been tagged with product information that correlates to the user-generated item description. Additionally, the stock image may be retrieved based the stock image having similar visual features to the submitted image. Following any changes to the received image, possibly including receipt of a replacement image, a new image score may be calculated.

As a non-limiting example, the service provider may generate recommendations and/or search results that may be presented to the consumer based at least in part on the image scores. In such examples, the service provider may use the image scores to influence the sort order of results on a discovery mechanism (e.g., search results of a products that include user-submitted images, etc.). Furthermore, the consumer may provide feedback data on images, by providing comments or rating the images (e.g., "liking" the images, etc.) and the image scores may be adjusted accordingly. An adjusted image score that has fallen below a predetermined threshold score may prompt the service provider to notify the user for a possible update of the image for the listing. Additionally, the consumer feedback data may be used as model retraining data.

The techniques and systems described herein may be implemented in a number of ways. Example implementations are provided below with reference to the following figures.

Figure 1:
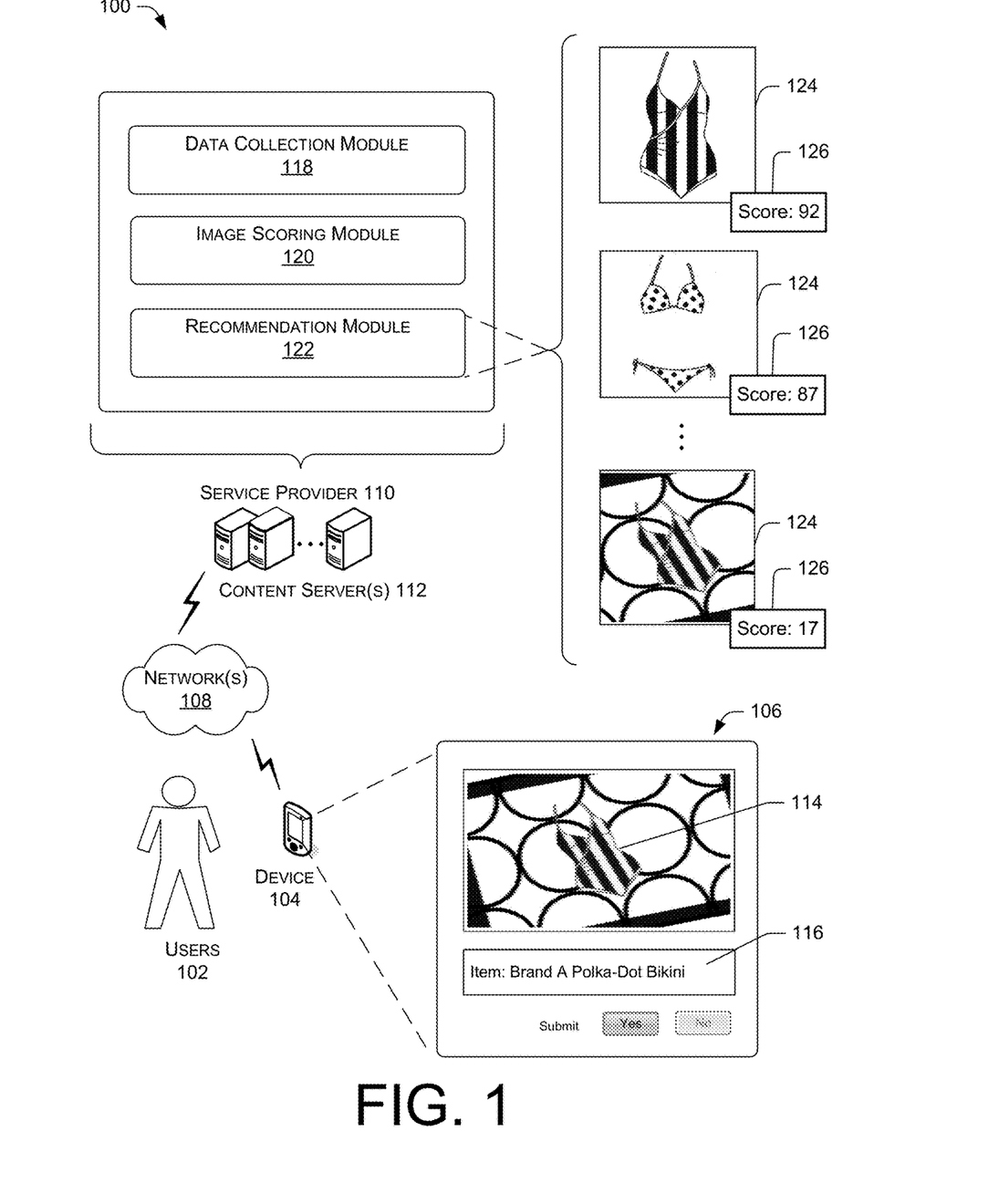
FIG. 1 is a schematic diagram showing an example system for receiving a listing with an image and item description from a user and determining an image score for the image.

FIG. 1 is a schematic diagram showing an example system 100 for receiving images and user-generated item descriptions from a user and determining image scores for the images, among other possible tasks that may be performed with the image scores. The system 100 may include a user 102 that utilizes a device 104, through one or more network(s) 108, to interact with a service provider 110. In some examples, the network(s) 108 may be any type of network known in the art, such as the Internet. Moreover, the service provider 110 and/or the devices 104 may communicatively couple to the network(s) 108 in any manner, such as by a wired or wireless connection.

The service provider 110 may be any entity, server(s), platform, etc., that evaluates images provided by users. In some embodiments, the service provider 110 may also provide items (e.g., products, services, etc.) to consumers on behalf of the users 102 (e.g., merchants). As shown, the service provider 110 may include one or more content server(s) 112. The service provider 110 may be implemented in a non-distributed computing environment or may be implemented in a distributed computing environment, possibly by running some modules on devices 104 or other remotely located devices. The content server(s) 112 may be any type of server, such as a network-accessible server.

In various examples, the service provider 110 may present items to consumers on behalf of itself, the users 102, merchants, and/or other entities. The items may include products, services, digital items, or other types of items. Example products may include, but are not limited to, garments, shoes, jewelry, sporting goods, eyewear, headwear, handbags, toys, furniture, bedding, bathroom accessories, electronics, games, ornaments, furniture, appliances, arts and crafts, or other items that are relatively easy to photograph. In at least one example, the service provider 110 described herein may cause one or more user interfaces to be presented to users 102 via devices 104. The user interface(s) 106 may provide tools to submit images and item descriptions to the service provider 110. The service provider 110 may score the image as described herein, and may provide suggestions or tools to improve the images and thus improve the images scores associated with a listing.

The service provider 110 may present products to consumers based partly on images scores from the images and/or data associated with the images. Additionally, when the service provider 110 receives an item search request from a consumer, the ranking of the search results may be influenced by the image score associated with each listing, such that a listing with an image having a poor image score, which may be determined by a score that falls below a predetermined threshold image score, may be ranked lower than a comparable listing having an average or high image score.

The users 102 (e.g., merchants, consumers, etc.) may interact with the service provider 110 via a site (i.e., a website), a self-service merchant portal, a self-service interface, or in any other manner.

In some embodiments, users may interact with the service provider 110 to offer one or more items 114 for acquisition by consumers. In various examples, the users may be any individuals, merchants, and/or entities that are a source or a distributor of items that may be acquired by the consumers. For example, the users may include entities that provide products or services to consumers, which may be offered or promoted directly by the users or by the service provider 110 or on behalf of the users. The users (e.g., merchants) may also offer those items via a physical location (e.g., a brick-and-mortar store), a merchant-branded merchant site (e.g., website), and/or any intermediary marketplace. The users may provide items 114 to the consumers with the assistance of the one or more devices 104, which may include any type of communication device. In some examples, the service provider 110 may generate and present user interfaces to prompt a user to improve a listing with suggestions on how to improve the listing's image score. For the purpose of this discussion, such user interfaces are referred to herein as "listing recommendation pages." Listing recommendation pages may display the image and user-generated item description as received from the user, as well as other information relevant to the listing, as illustrated and discussed in FIG. 4, below. In various examples, a user may choose to improve the image score associated with the listing by actuating a control on a user interface presented on a display of the device 104 to edit the image. The control may be associated with a hyperlink or an overlay that prompts the user to submit another image or finish submission of the image.

In at least one example, consumers may interact with the service provider 110 to acquire one or more items that are offered for acquisition on behalf of the users and/or the service provider 110. In some examples, the service provider 110 may generate and present user interfaces for presenting one or more products to a consumer. For the purpose of this discussion, these user interfaces are referred to herein as "product pages". Based at least in part on the image quality associated with the products, the consumer may receive an improved product recommendation and search results.

In some examples, the users 102 may operate corresponding devices 104 to perform various functions associated with the devices 104, which may include at least some of the operations and/or modules discussed above with respect to the service provider 110.

In at least one configuration, the content server(s) 112 may include any components that may be used to facilitate interaction between the service provider 110 and the devices 104. For example, content server(s) 112 may include a data collection module 118, an image scoring module 120, and a recommendation module 122.

The data collection module 118 may receive data from the users 102 (e.g., merchants, consumers, etc.). The data may include an image, such as images 124, which may or may not be associated with the same user. The data may include an item description, which may be generated by the user 104 or by another entity or person. In at least one example, the data collection module 118 may receive information associated with a user such as bank account information and merchandise information (e.g., images, product descriptions, inventory available, price information, location, etc.). In at least one example, the data collection module 118 may receive information associated with consumers such as user information and actions associated with a retail purchase account associated with a consumer (e.g., purchases, sales, items on a saved-items list (i.e., a wish-list), exchanges, returns, browsing history, search history, recommendations, feedback on purchases, personal demographic information, location proximity, etc.). Additionally or alternatively, the data collection module 118 may access and observe user information and actions associated with third party sources and systems (e.g., social networks, professional networks, partner webstore purchases, etc.). The data corresponding to the user information may be mapped to a user profile corresponding to a merchant or consumer that may be stored in a database, cloud storage system, or other data repository.

The image scoring module 120 may access the images 124 and may process the images. The image scoring module 120 may generate scores 126 for images 124 and associate the scores 126 with the images 124, respectively. For the purposes of this discussion, an image may be a still image, a live image, a two-dimensional image, a three-dimensional image, a video, or any other type of image. The image scoring module 120 may access images from various sources such as social networking application services, cloud storage repositories, local storage repositories, remote storage repositories (e.g., databases associated with devices 104), and/or other locations. Additionally and/or alternatively, the image scoring module 120 may receive images that are input by the users 102 (e.g., merchants, consumers, etc.). For instance, a user may upload one or more images via his or her device 104 using the data collection module 118 and the image scoring module 120 may access the uploaded images. In at least one example, a user may enter an item description 116, which may be a user-generated description, to be associated with the uploaded images as metadata, as described below. Note that the example item description 116 shown in FIG. 1. does not correspond to the item 114, which is used to illustrate functionality of the image scoring module 120 in the discussion below.

In some embodiments, the image scoring module 120 may provide image improvement suggestions to users. The image scoring module 120 may utilize data associated with the user to identify one or more image improvements to recommend to the merchant. For instance, the image scoring module 120 may utilize the product description and image uploaded by the user and actions associated with posting a new listing to assess the quality of the image and make suggestions for improving the image, typically based on the image score and/or individually scored attributes of the image. The image scoring module 120 may also recommend a stock image to replace the uploaded image to help improve the quality score.

In various embodiments, the recommendation module 122 may utilize data associated with quality assessment to surface a listing for a product recommendation and/or for search results of a query. The recommendation module 122 may determine a product type of interest to a consumer and retrieve listings categorized under this product type. Additionally, the recommendation module 122 may filter listings to surface products with quality scores above a predetermined threshold. In some embodiments, the data collection module 118 may enable customers to flag a listing as having a low-quality image or having other quality issues, and may provide this feedback to the user.

As a non-limiting example, a user may add a listing through a self-service user interface. The image the user adds may be an image of poor quality depicting a blurry black-and-white striped bikini laying tilted on a rug, and the item description entered may be "Brand A Polka-Dot Bikini." The service provider 110 receiving the listing may perform image analysis on the image and assign the image a low score. When the service provider 110 receives a product search for "swimsuits," the service providers may use the image scores associate with the listing to influence the search results, such that a swimsuit with the higher score may appear first on the list.

Figure 2:
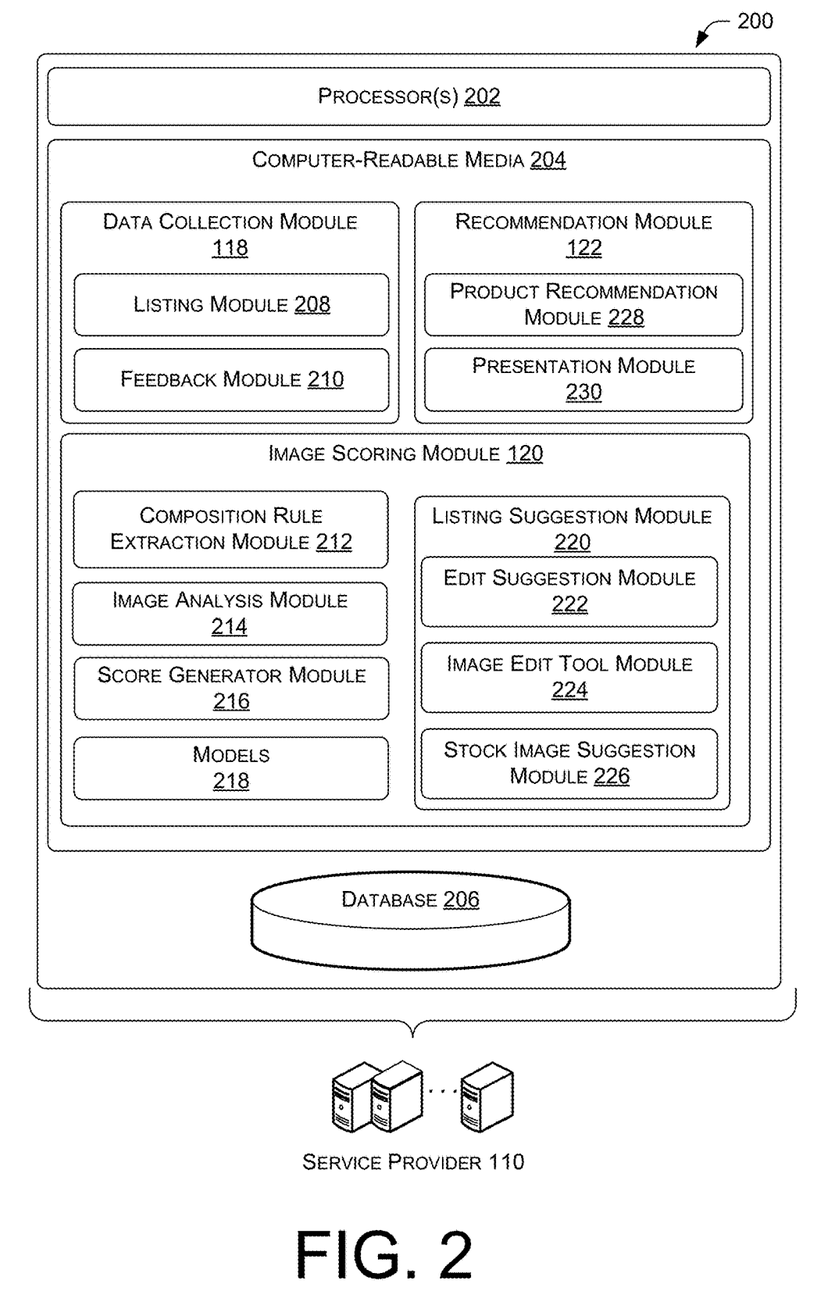
FIG. 2 is a block diagram of an illustrative computing architecture of the content servers.

FIG. 2 is a block diagram of an illustrative computing architecture 200 of the content provider. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service 100.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the data collection module 118 and associated components, the image scoring module 120 and associated components, the database 206, the recommendation module 122 and associated components, and a presentation module 230, which are described in turn. The components may be stored together or in a distributed arrangement.

The data collection module 118 may include a listing module 208 to receive data from the merchants, and a feedback module 210 to collect feedback data from the human users including but not limited to merchants, consumers, and/or image experts. In the listing module 208, the merchant may provide listing information via a self-service website, application, or browser on a device 104. In some examples, the listing module 208 allows the merchant to create listings and to upload images associated with the images, along with an associated user-generated item description. The listing module 208 may receive other data related to the listing, including but not limited to, product category, item pricing, special shipping costs, additional images, condition of the item, and availability date.

The feedback module 210 may receive feedback data from the merchants. Merchants may provide feedback via a self-service web site, application, or browser on a device 104, and/or any other customer service communication portal. Merchants may provide feedback relevant to listing suggestion provided by listing suggestion module 220 as described below. For example, if a merchant is attempting to create a listing through the listing module 208, by uploading an image that correctly corresponds to the item description, but the image scoring module 120 provides a negative feedback on the correlation of image to item description, the merchant may provide feedback as to why the scoring was incorrect.

The feedback module 210 may receive feedback data from the consumers. Consumers may provide feedback via a self-service web site, application, or browser on a device 104, and/or any other customer service communication portal. Consumers may provide feedback relevant to previously recommended and/or acquired items, preferences, interests, likes/dislikes, complaints, and general comments. For instance, feedback data may include a type of feedback (e.g., positive, neutral, negative) and may include feedback provided directly from consumers, user ratings relating to items and/or merchants, user reviews of items and/or merchants, user responses to surveys and/or questionnaires, customer service feedback, information from sites (i.e., websites), and so on. As discussed elsewhere, this feedback may be used as training data to modify a model and/or to prompt a user to update an image, or the feedback may be used for other reasons.

In some examples, the consumer feedback data from the feedback module 210 may include data associated with images. In at least one example, the consumer feedback data associated with images may be explicitly provided. That is, consumers may provide explicit feedback that may include positive, neutral, or negative feedback with respect to particular images. For instance, a consumer, via the feedback module 210, may indicate that she likes an image such that the listing with the image should be prioritized, as described below. Or, a consumer may indicate that he dislikes an image such that the image should not be used as a representative of the listing, as described below. Furthermore, consumers may provide other explicit feedback associated with images. For instance, a consumer can explicitly indicate that the consumer likes an image or dislikes an image. Additionally, a consumer, via the feedback module 210, can explicitly indicate that the image does not correspond to the item description or that the image contains inappropriate material.

In other examples, the consumer feedback data associated with images may be implied. For instance, various heuristics may be utilized to imply that a consumer likes or dislikes an image. The feedback module 210 may monitor user actions with respect to individual images to imply whether a consumer likes or dislikes an image. In at least one example, the feedback module 210 may determine that a consumer likes an image based at least in part on determining that a consumer shared the image a number of times above a threshold, clicked on the image a number of times above a threshold, subsequently purchased a product represented in the image (e.g., converted), and/or interacted with the image in other ways.

In some examples, consumer feedback data may be mapped to corresponding user profiles that may be stored in the database 206, cloud storage system, or other data repository. In other examples, consumer feedback data associated with images and/or listings may be associated with individual images via an image data structure for storing information associated with the individual images. As a result of accessing and/or receiving feedback data, the feedback module 210 may influence the composition rules for images consumers complain about or dislike.

The feedback module 210 may also receive feedback data from image experts. Image experts may or may not be employed by the service provider to provide feedback related to individual image quality or the correlation of the item description to the image. Image experts may provide feedback via a self-service website, application, browser, or communication portals. Additionally, image experts may help select the initial training image data set and label the images for training a machine learning model as will be discussed further below. Samples of listings, which may be selected at random or based on the listings performance, may be presented to image experts to provide additional feedback data on the accuracy of the image scoring. For example, a service provider may have authorized image experts examine a sample of listing and associate image scores, which may otherwise be hidden from a user, and provide feedback on whether image quality issues are identified correctly and the correlation to item descriptions is identified correctly. Based on the image expert feedback data, additional training data sets may be generated, and/or the image scoring model may be further refined.

As discussed above, the image scoring module 120 may access images and may process the images. The image scoring module 120 may generate scores for images and associate the score with image. The image scoring module 120 may include the composition rule extraction module 212 for extracting image classifying features from images and training one or more machine learning models for determining a score or classification of the image (e.g., good or bad quality image, etc.). Furthermore, the image scoring module 120 may include an image analysis module 214 for recognizing objects in the images, and determining item correlation scores indicating how closely correlated an image is for an item description. Additionally, the image scoring module 120 may include a score generator module 216 for determining a base image score based on one or more composition rule(s) and modifying the image score based on the correlation scores. Also, the image scoring module 120 may include a listing suggestion module 220 for providing improvement suggestions to a listing when appropriate, for example, when the score generator module 216 has generated a score for an image that is below an acceptable quality threshold.

At least some of the information generated by the image scoring module 120 (and sub-modules) may be stored in metadata, which may be associated with the images. Metadata can have various formats including Information Interchange Model (IPTC), Extensible Metadata Platform (XMP), Exchangeable Image File (EXIF), Dublin Core Metadata Initiative (DCMI), Picture Licensing Universal System (PLUS), etc. The metadata may include details that are relevant to an image itself, as well as information about its production. The metadata may include technical metadata, descriptive metadata, administrative metadata, etc. Technical metadata may include image capturing details and settings, image capturing device brand and model, date and time that the image was captured, and/or Global Positioning System (GPS) location (i.e., geotags) where the image was created (as determined by geolocation devices).

In some examples, the metadata may be added manually and edited through particular applications and/or added directly via an image capturing device. In other examples, the metadata may be generated automatically by the device 104 that captured the image and/or a service provider 110. Additionally, the metadata associated with stock images may be tagged with product information, including Universal Product Code (UPC), item category, brands, etc. For instance, in at least one example, the image scoring module 120 may apply one or more of the models 218 to determine information about an image including, but not limited to, one or more subjects depicted in images, objects depicted in images, activities depicted in images, geographical locations depicted in images, scenes depicted in images, events depicted in images, seasons depicted in images, and/or other depictions in the images.

The composition rule extraction module 212 may train a one or more of the models 218 to determine composition suggestions. In at least one example, one or more of the models 218 may be machine learning models that may extracts features from the image and use those features to detect the image quality. The machine learning models can include supervised learning algorithms (e.g., convolutional neural network model, artificial neural networks, Bayesian statistics or networks, Gaussian process regression, logistic model trees, support vector machines, etc.), unsupervised learning algorithms (e.g., artificial neural networks, association rule learning, hierarchical clustering, cluster analysis, etc.), deep learning algorithms, and/or any learning algorithms. In at least one example, composition rule extraction module 212 may use scored data sets as input to train one or more of the models 218 (e.g., the classifiers). Data is collected for training the one or more of the models 218 and generating a quality index code defining why the image quality is low scoring (e.g., bad). In some embodiments, the training data sets may be labeled by hand, the labeled images may be labeled as high quality or low quality. A first portion of the training set may be labeled as high quality or good quality to indicate that the first portion of images from the training set contains images with good composition. A second portion of the training set is may be labeled as bad quality or low quality to indicate that the second portion of the training set contains images with poor composition. In which case, the second portion of images may be further labeled to additionally include at least one reason codes associated with image quality labels, that is the quality index code tagging the reason a certain image is labeled as low quality. For example, a poor quality image may be: (1) labeled as "low quality" to indicate that an image has poor composition; and (2) labeled with reason codes associated with image quality issues—BLURRY and NOISY_BG—to indicate that the reason for the determination of poor composition is that the background of the image is too busy and the item depicted is not in focus.

In some examples, composition rule extraction module 212 may use deep machine learning models to assess the quality of an image. The learning model may receive an initial training data set that may be manually labeled based on features to extract. The initial training data set of labeled images is used to build classifiers to classify a test set of images as good or bad or words associated with positive quality or negative quality. For example, the labeling of images as "good" may also be described labeling the image as good quality, high quality, or high scoring. Similarly, the labeling of images as "bad" may also be described as labeling the image as bad quality, poor quality, low quality, or low scoring. Additional training data sets may be added, which may add or remove features to extract, to help refine training. Training may be refined until the model is able extract features from images and using the extracted features to classify images within a predetermined precision parameter or precision threshold.

Furthermore, the composition rule extraction module 212 may determine image score weight values for each composition rule extracted. For example, a first composition rule corresponding to busy background may have stronger influence than a second composition rule of centering the object in the image, thus the first weight value for the first composition rule may be higher than the second weight value for the second composition rule. Accordingly, an image score may be based on a composition score that is based at least in part on the first composition rule adjusted by the first weight value and the second composition rule adjusted by the second weight value.

Additionally, the composition rule extraction module 212 may receive additional training sets to help refine the one or more of the models 218. For example, when a merchant was incorrectly instructed to edit their image, the merchant may provide feedback that the image scoring was incorrect, the images that was incorrectly marked may be labeled manually and used as additional training data.

The image analysis module 214 may extract visual features from the images. The images being any images in the database 206 including the stock images and images received from data collection module 118. For the purpose of this discussion, a visual feature is a piece of information associated with an image that may be relevant for solving a computational task (e.g., identifying one or more subjects depicted in images, objects depicted in images, activities depicted in images, geographical locations depicted in images, scenes depicted in images, events depicted in images, seasons depicted in images, etc.). The image analysis module 214 may extract low-level features (e.g., edge detection, corner detection, blob detection, ridge detection, scale-invariant feature transform, etc.), shape based features (e.g., thresholding, blob extraction, template matching, hough transform, etc.), and/or other features.

The image analysis module 214 may utilize the extracted visual features, image data, and/or product data for identifying items depicted in images. Image data may include data associated with an image and may include metadata, as described above. In additional and/or alternative examples, the image analysis module 214 may utilize object recognition techniques for determining the descriptive metadata based on extracted visual features. For example, the object recognition techniques may include appearance-based methods (e.g., edge matching, greyscale matching, gradient matching, etc.), feature-based methods (e.g., interpretation trees, pose consistency, pose clustering, scale-invariant feature transform (SIFT), speeded up robust features (SURF), etc.), and/or bag of words modeling.

In some embodiments, image analysis module 214 may extract visual features from tagged stock images from database 206 and generate a search index of visual features, the tagged stock images may be tagged with verified data containing product information related to what each stock image depicts. The image analysis module 214 may extracted visual features from an uploaded image to be analyzed and compare the visual features of the uploaded image to the visual features of the search index and retrieve the corresponding stock images that has at least a threshold number of similar visual features. From the retrieved stock images, the product data may be extracted from the stock images to help identify the object or product depicted in the uploaded image. The product data extracted from the stock images may be used as image data to be associated with the uploaded image.

The image analysis module 214 may compare the image data associated with the uploaded image with the item description to determine a correlation score. The one or more of the models 218 can determine the correlation score based at least in part on determining a correlation between the image data and the item description. A high correlation score (e.g., a correlation score above a threshold value or within a pre-determined range of values) indicates an image is highly appropriate for a particular item description and therefore may be a representative image. A low correlation score (e.g., a correlation score below a threshold value or outside of a pre-determined range of values) indicates an image is not appropriate for a particular item description. In some embodiments, the image scoring module 120 may select a predetermined number of stock images that have correlation score above a predetermined threshold as alternative images to be use by the stock image suggestion module 226 as described below. Since the alternative images should be a near duplicate image of the uploaded image, the threshold value for the similarities in visual features may be higher than the threshold value used for object identification.

The score generator module 216 may score the images using the composition rules extracted and the corresponding weight values from composition rule extraction module 212. For example, the score generator module 216 may receive an image from a user to be used as a listing image. If the image received is too dark and out of focus, the score generator module 216 may generate a low score for the image.

In some embodiments, the score generator module 216 may modify the image scoring results based on the item description correlation score. For example, even if the image received a good image score, but the image has poor correlation (e.g., depicts a full-body swimsuit while the item description is for a bikini), the score generator module may decrease or substantially decrease the overall score for the listing.

In some embodiments, the listing suggestion module 220 may provide recommendations and options for users to improve their content quality. The listing suggestion module 220 may include an edit suggestion module 222, an image edit tool module 224, and a stock image suggestion module 226.

The edit suggestion module 222 may allow the user to improve an image score by uploading a new higher quality image or updating the item description. To help guide the production of a higher quality image, the edit suggestion module 222 may translate the quality index code, identified by the image scoring module 120 as image quality issues that could be improved, into plain English and provide the list of suggestions to the user as an output to the user device. For example, the image scoring module 120 may determine the quality issue may be NOISY_BG, which could translate to a suggestion of "please use a white background." Additionally, where the number of identified image quality issues is too long or exceeds a threshold number of suggestions value, the image quality issues corresponding to a composition rules with a lower weighted value may be trimmed. For example, if the number of suggestions to make has been limited to a predetermined value of ten, but fifteen image quality issues has been identified, then the edit suggestion module 222 may provide only ten composition rules suggestion having the top ten weight values. Furthermore, since having a correct item description is important for a listing, a low item description correlation score (having a correlation score below a predetermine threshold) could put the suggestion to change item description on the top of the suggestion list.

In some embodiments, the image edit tool module 224 may provide some simple editing tools for the user. In at least one embodiments, the image edit tool may leverage data gathered in image scoring module and automatically perform some of the suggested edits as described in edit suggestion module 222. For example, an edit suggestion related cropping the image may leverage data that has determined where the edge of the object is to automatically set the cropping tool. The editing tools provided with the image edit tool module 224 may undo the "automatically performed edits" or further refine the edits. The image edit tool module 224 may provide any number of image editing tools including, but not limited to, crop, brightness adjust, rotate, zoom, sharpness adjust, and background removal. In some embodiments, some edit functions may be automatically applied to the image, such as cropping, to provide suggested image alternative to the user. For example, an edge detection algorithm may be used to automate cropping of some images, which may improve an image score.

In various embodiments, the stock image suggestion module 226 may present a selection of stock images to the user to replace the uploaded image. The stock image suggestion module 226 may retrieve the selection of stock images from the database 206 based on the stock images having been tagged with product data that correlates to the user-generated item description. For example, if a user uploaded an image of a toy car, but provided an item description of "Classic Red Tricycle," a stock image that is selected based on the user-generated description may retrieve an image of a red tricycle from the stock image database. In at least one embodiment, the stock image suggestion module 226 may present stock images already identified as similar image as part of image analysis module 214, or the stock image suggestion module may perform an additional and/or alternative near image search. The stock image suggestion module 226 may use any image retrieval methods to identify stock images having similar visual attributes to the uploaded images, including appearance-based methods (e.g., edge matching, greyscale matching, gradient matching, etc.), and feature-based methods (e.g., interpretation trees, pose consistency, pose clustering, scale-invariant feature transform (SIFT), speeded up robust features (SURF), etc.). For example, the stock image suggestion module 226 may extract a set of visual words from the uploaded images, analyze the extracted set of visual words with respect to an index of sets of visual words for the stock images, and retrieved the stock images with likeness above a threshold value. One or more of the models 218 may be utilized for determining a threshold value for identifying images with an acceptable level of similarity to be recommended.

The database 206 may store at least some data including, but not limited to, data collected from data collection module 118, listing module 208, and data collection module 118, including data associated with user profiles, user information, feedback data, images received from users, stock images. User profile(s) may correspond to one or more user profiles associated with the service provider 110. In some examples, a user profile may include information associated with a merchant such as marketplace information and merchandise information associated with a merchant, user information and actions associated with third party sources and systems, review and sales data, etc. In some examples, a user profile may include information associated with a consumer such as user information and actions associated with a retail purchase account associated with a consumer, user information and actions associated with third party sources and systems, feedback data, etc. The database 206 may store metadata associated with the images. The database 206 may also store the general image database and the stock image database. In additional or alternative examples, at least some of the data may be stored in a cloud storage system or other data repository.

The recommendation module 122 may provide recommendations to consumers through the product recommendation module 228 and present general recommendations through the user interface of the presentation module 230. In some examples, the recommendation module 122 may present a consumer user interface and utilize data associated consumers to recommend a product to the user. In various examples, the recommendation module 122 may present a merchant user interface and utilize data associated with the merchant to present listing improvements suggestions as determined by listing suggestion module 220 to the user.

In at least one embodiment, the product recommendation module 228 may identify and recommend products to consumers and such products may be considered products of interest to the consumers. In some examples, product recommendation module 228 may utilize data associated with a retail purchase account associated with the consumer to identify one or more products to recommend to the consumer. For instance, product recommendation module 228 may utilize data associated with user information and actions associated with the retail purchase account associated with a consumer (e.g., purchases, sales, items on a saved-items list (i.e., a wish-list), exchanges, returns, browsing history, search history, recommendations, personal demographic information, location proximity, calendar information, etc.) to determine new products to recommend to the consumer. Additionally or alternatively, the product recommendation module 228 may utilize data associated with user information and actions associated with third party sources and systems (e.g., social networks, professional networks, partner webstore purchases, etc.) to determine new products to recommend to the consumer. Moreover, in some examples, product recommendation module 228 may utilize feedback data to determine new products to recommend to the consumer. One or more of the models 218 may be utilized for determining new products to recommend to consumers leveraging data associated with user information and actions associated with the retail purchase account, data associated with user information and actions associated with third party sources and systems, and/or feedback data.

The presentation module 230 may cause one or more products as identified by the product recommendation module 228 to be presented in a consumer user interface to a user via a display of a device 104. The one or more products identified by the product recommendation module 228 as being a product of interest to the user may be influenced by the image score of the products listing. In some examples, a related-product recommendation panel having limited recommendation space may present only listings having image scores above a predetermine quality threshold and/or may present the listings with the highest quality scores first such that the lower scored listings may require scrolling to view. Additionally, the presentation module 230 receiving a product search from a user may sort the results according to the quality score before presenting the search results to the user.

Additionally and/or alternatively, the presentation module 230 may cause the recommendations as determined and ranked by production recommendation module 228 to be presented to the consumer via a display of a device 104. For instance, the presentation module 230 may cause the recommendations to be presented to the consumer via a unique user interface that provides functionality for the consumer to view the recommendation and/or acquire the one or more products associated with the recommendation, a text message, an email, and/or a push notification.

Figure 3:
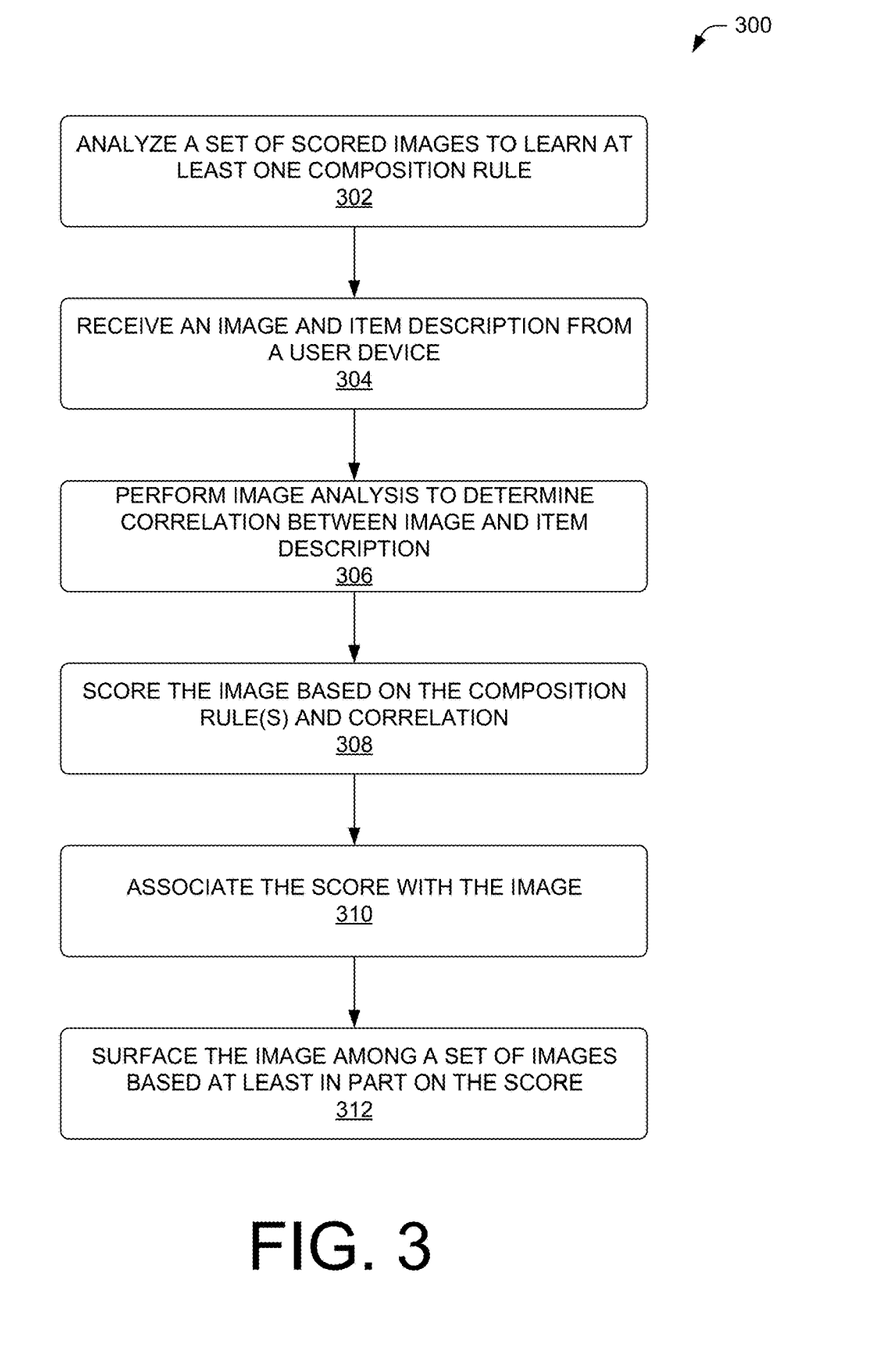
FIG. 3 is a flow diagram of an illustrative process for learning a composition rule, determining an image score based on the composition rule, and using the image score in association with the image.
Figure 5:
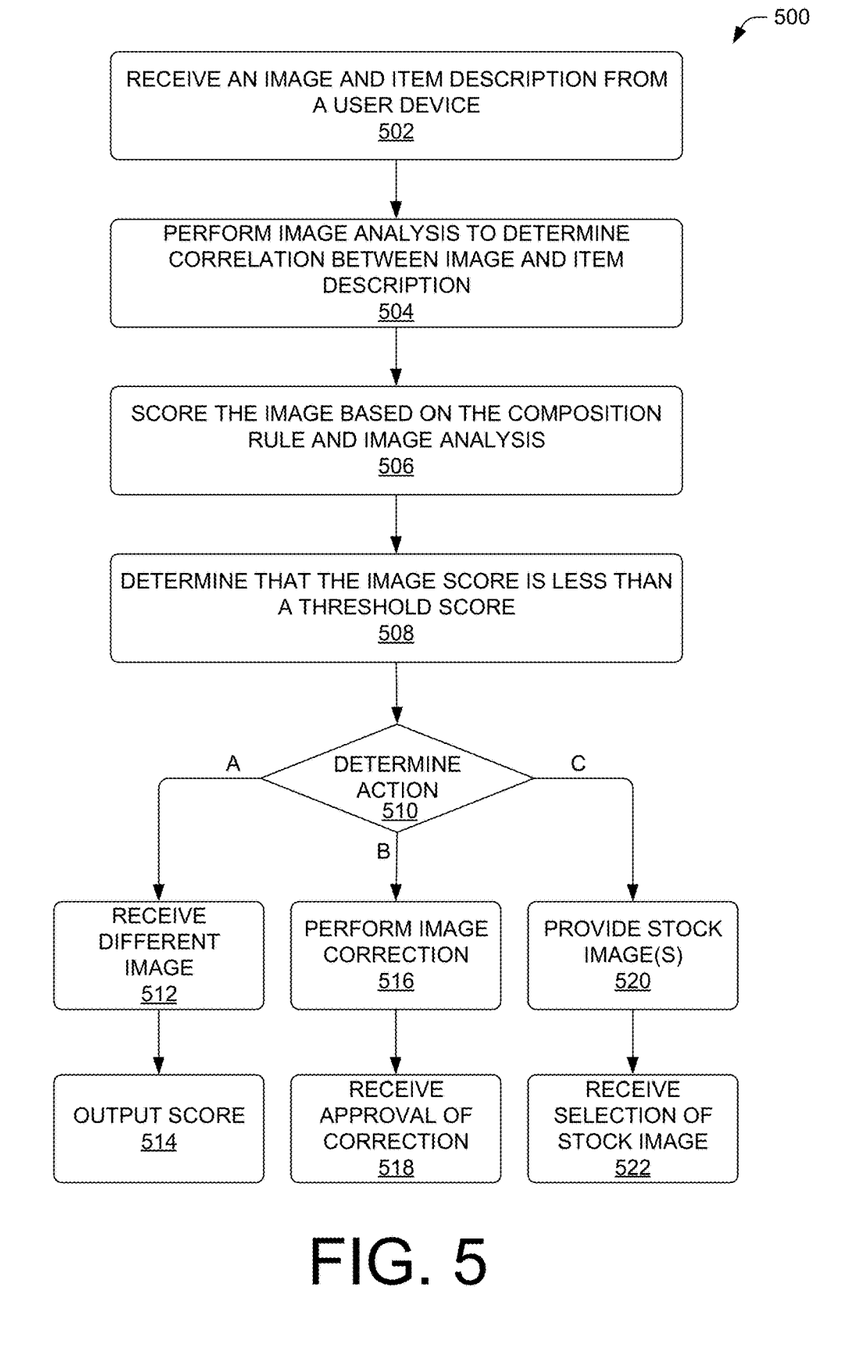
FIG. 5 is a flow diagram of an illustrative process to determine an image score for a user submitted image and item description, and provide options to improve an image score.

FIGS. 3 and 5 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 3 is a flow diagram of an illustrative process 300 to learn composition rule, determine an image score based on the composition rule, and use the image score in association with the image. The process 300 is described with reference to the system 100 and may be performed by the user device 104 and/or in cooperation with any one or more of the content servers 112. Of course, the process 300 (and other processes described herein) may be performed in other similar and/or different environments.

At 302, the image scoring module 120 may access images stored in database 206. The composition rule extraction module 212 may analyze a set of scored images stored in database 206 to learn one or more image composition rule. The scored images may be labeled by a human, for example. Additionally and/or alternatively the image scores may be labeled by consumers based at least in part on consumer feedback data. The labels may indicate whether the image quality is good or bad, and may include a quality index code as to why the image is good and/or bad. For example, the quality index code could correspond to a blurry image, lighting is poor, item is cropped, or noisy background. The learning model may extract features from the images and use the features as image composition rule to determine the image quality. The learning model may be further refined by feedback provider by merchant on whether or not their images are being classified correctly.

At 304, the listing module 120 may receive an image and item description from a user device. The image may be obtained by the user device, such as by a mobile telephone that includes a camera. The item description may be generated manually by the user or may be selected or determined from other information.

At 306, the item analysis module 214 may perform image analysis on the image to identify the item depicted in the image. The item analysis module 214 may determine if there is a correlation between the received image and user-generated item description. For example, the item analysis module 214 may generate keywords for a description of the item based on object detection and may compare those keywords to the item description to determine if a threshold correspondence is achieved. Of course, other techniques for validating correspondence may be used.

At 308, the score generator module 216 may score the image based on composition rules and/or the image analysis. The score generator module 216 may generate an image score based on image composition alone. Additionally, the score generator module 216 may decrease the image score or generate a second lower image score based on the image having poor correlation to user-generated item description.

At 310, the score generator module 216 may associate the image and/or the listing with the image score after the scoring solution is complete. The base image score and/or the adjusted image score factoring in the item description correlation may be stored in the data structure associated with the image. In some embodiments, the image scores may be stored in association with the listing data.

At 312, the product recommendation module 228 may use the image scores to influence presentation of search results and/or production recommendations. As described above, listings with images having higher image scores, may be ranked higher on a search request list and may be surfaced on a product recommendation list.

Figure 4:
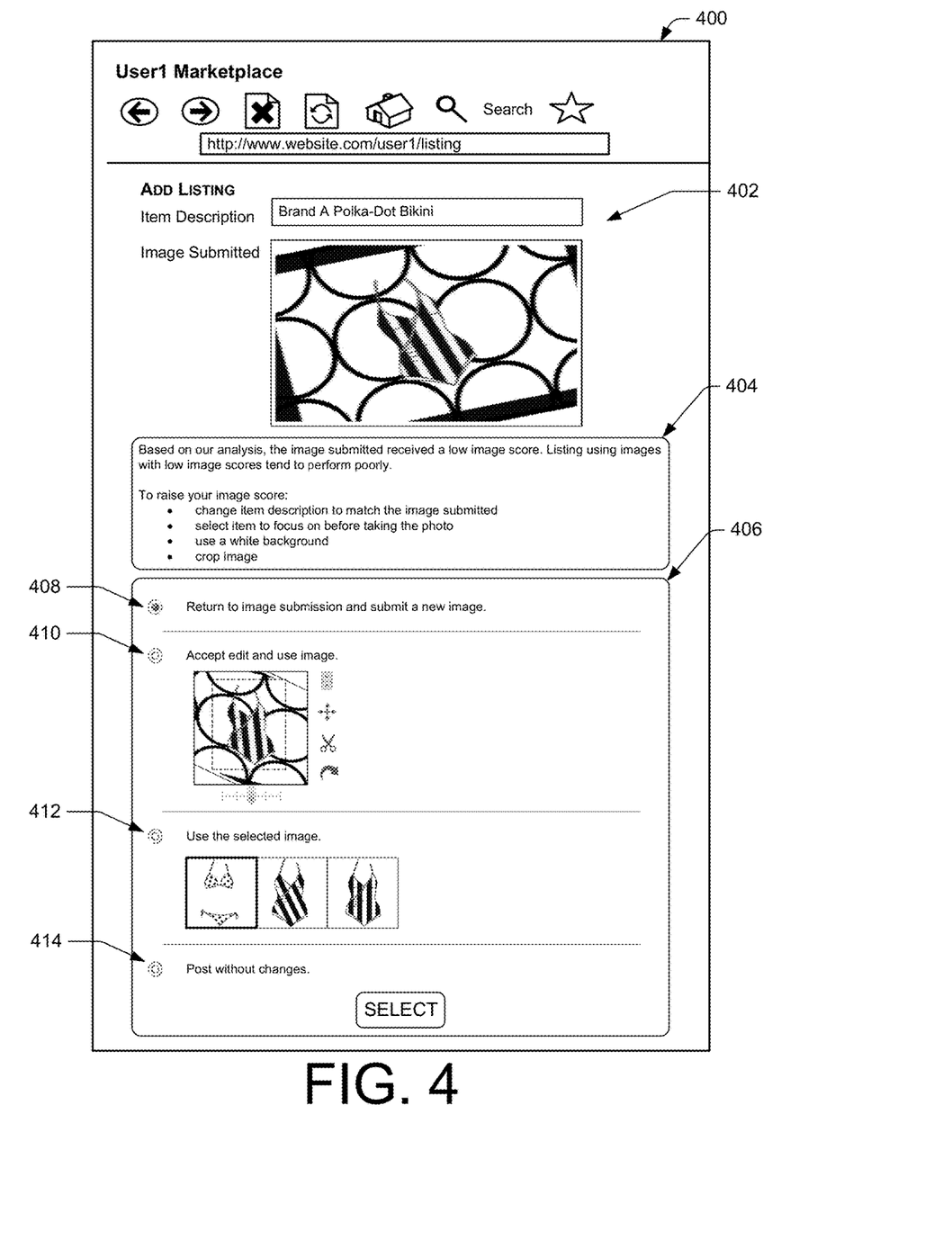
FIG. 4 is a schematic diagram showing an example user interface that may be presented to a user with suggestions to improve the image score.

FIG. 4 is a schematic diagram showing an example user interface 400 that may be presented to a merchant for creating a new marketplace listing. The presentation module 230 may cause a user interface (e.g. user interface 400) to be presented to a user utilizing any communication channel, such as an e-mail message, a website associated with the service provider 110, a text message, a push notification, a social network site, an application that is associated with the service provider 110 and that resides on device(s) 104 corresponding to the user.

In various embodiments, the user interface 400 may include the data 402 received from the user (which may include an image and an image description), the image scoring results 404, and user action options 406. The data 402 received from the user may present the image and the user-generated item description as received from the user for the user to verify the item description and to demonstrate how the image may appear to a potential consumer.

The image scoring results 404 may present to the user the results from the image scoring module 120. For example, the image scoring results 404 may let the user know that the image submitted has received a low image score. A determination of whether or not an image score was low or poor may be based on the score having a value less than a predetermined image quality threshold. In some embodiments, based on a low image score result, the image scoring results 404 may present the suggestions as generated by the edit suggestion module 222.

In some embodiments, the user interface 400 may include all or portions of user action options 406. The user action options 406 may include a return option 408 for the user to return to the item submission page to provide a new image and/or provide a new user-generated item description. The user action options 406 may also include a post as-is option 414 to create a listing using the unedited image and item description despite the low image score. In some embodiments in which the image score was determined to be egregiously low, the selection of the option to post without changes 414 may generate a follow-up prompt to notify the user that an image of extremely low quality may result in the image not being used as all. Additionally and/or alternatively, the merchant may be asked to provide feedback on the accuracy of the image scoring. Any feedback data may be collected to be used for additional machine training.

In at least one embodiment, the user action options 406 may also include a quick edit option 410 to provide modifications to the user-submitted image. The quick edit option 410 may provide a selection of image editing tools for the user to perform the modifications. In some embodiments, the quick edit option 410 may already incorporate some edit suggestions such as removing the background from the image, centering the item, and/or cropping the image.

Additionally and/or alternatively, the user action options 406 may include a stock image option 412 to provide a selection of stocks images for the user to use in place of the submitted image. The stock image option 412 may select a stock image from database 206, the stock image may be associated with metadata tagged with item description having a strong correlation to the user-generated item description. Additionally and/or alternatively, the stock image option 412 may retrieve at least one stock image based on the stock image being visually similar the user submitted image.

As a non-limiting example, based at least in part on determining that a merchant is adding a listing by uploading a low-quality image depicting an item with the item description of "Brand A Polka-Dot Bikini," the service provider may retrieve a stock image from the database. Based on the item description of "Brand A Polka-Dot Bikini," the service provide may retrieve a stock image tagged as "Brand A Polka-Dot Bikini." Alternatively, based at least in part on image analysis, the image analysis may be able to identify the item depicted in the image as a black-and-white striped swimsuit, and the service provider may retrieve a stock image tagged as a black-and-white striped swimsuit. Additionally, based at least in part on image analysis and the item identified, the image analysis may be able to extract visual attributes in the uploaded image and may retrieve a set of stock images belonging to a similar item category, and extract the visual attribute of the set of stock images to compare to the uploaded image. The stock image, with visual attributes having similarities to the uploaded image above a threshold, may be presented.

FIG. 5 is a flow diagram of an illustrative process 500 to determine an image score for a user submitted image and item description and provide options to improve a low image score. The process 500 is described with reference to the system 100 and may be performed by the user device 104 in cooperation with any one or more of the content servers 110. Of course, the process 500 (and other processes described herein) may be performed in other similar and/or different environments.

At 502, the data collection module 118 may receive an image and a user-generated item description from a user device. The image received may be stored on the user device, or generated by a prompt for the user to capture the image. The item description may be generated manually by the user or may be generated from a combination of drop-down list selection.

At 504, the item analysis module 214 perform image analysis to determine if there is a correlation between the received image and user-generated item description. The item analysis module 214 may perform object analysis on the image to determine the item depicted in the image. The item analysis module 214 may determine if there is a correlation between the item depicted and user-generated item description and may generate a correlation score. A correlation score that falls below a predetermined correlation threshold value may set an image score weight for the correlation score as being higher than a baseline image score weight for the correlation score.

At 506, the score generator module 216 may score the image based on composition rules and the image analysis. The composition rules may have been previously learned by one or more learning models. The score generator module 216 may decrease the image score based on the image having poor correlation to user-generated item description. Additionally, the score generator may decrease the image score based on poor image quality when applying the composition rules.

At 508, the image scoring module 120 may determine that the image score falls below an image quality threshold score. The service provider may use this low image score in product recommendation module 228 to influence consumer search results or product promotion. For example, when a consumer is searching for an item matching the user-generated item description, the service provider may use the associated low image score to influence the order in which all items matching the search terms are presented, where a low image score may place listing lower in the order.

At decision operation 510, the presentation module 230 may provide a user interface with option to determine the next action to take. Based on a low image score, the user interface may notify the user of the low image score, may provide specific composition improvement suggestions as determined by the listing suggestion module 220, and/or may receive user input to determine the next action step to take. For example, a user may decide to submit a different image so that operation 512 will receive a different image to process. At 514, the different image may be scored and the score may be output.

In some embodiments, decision operation 510 may include operation 516 to perform image correction on the image using the edit tool and operation 518 may receive approval for the image correction. In various embodiments, decision operation 510 may further include operation 520 to provide one or more stock images for the user, retrieved from the stock image database to be use as alternate images, and operation 522 to receive a selection of which of the one or more stock images to be used in place of the image received from the user, when multiple selections are available for example. Before posting listings, with an image edited and received at operation 518 or with a stock image selected and received at operation 522, the image score may be recalculated and associated accordingly.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors; and
   a memory that stores one or more computer-executable instructions that are executable by the one or more processors to cause the system to perform operations comprising:
      analyzing a set of scored images to learn at least a first composition rule and a second composition rule;
      receiving an image and an item description from a user device, the item description being a user-generated description;
      performing image analysis of the image to determine a correlation between the image and the item description;
      determining a correlation score for the image based at least in part on the image analysis;
      determining a composition score for the image based at least in part on the first composition rule and the second composition rule;
      determining an image score for the image based at least in part on the composition score and the correlation score;
      associating at least the image score with the image; and
      determining a composition suggestion for the image based at least in part on the composition score.

2. The system as recited in claim 1, the operations further comprising:
   determining that the image score is less than a threshold image score; and
   receiving a replacement image from the user device in response to output of the image score.

3. The system as recited in claim 2, further comprising receiving the replacement image from a stock image database, the replacement image being selected based at least in part on the item description.

4. The system as recited in claim 1, wherein the first composition rule is associated with a first weight and the second composition rule is associated with a second weight, and wherein the determining the composition score for the image is further based at least in part on the first composition rule modified by the first weight and the second composition rule modified by the second weight.

5. A method comprising:
   receiving an image and an item description from a user device;
   analyzing a set of scored images to learn one or more composition rules;
   evaluating the image using the one or more composition rules;
   performing image analysis of the image to determine a correlation between the image and the item description;
   determining an image score for the image based at least in part on the one or more composition rules and the correlation between the image and the item description; and
   associating the image score with the image.

6. The method as recited in claim 5, further comprising:
   determining a composition suggestion for the image based at least in part on the image analysis and the correlation between the image and the item description;
   determining that the image score is less than a threshold image score; and
   outputting the composition suggestion for the image.

7. The method as recited in claim 5, further comprising:
   determining that the image score is less than a threshold image score; and
   providing an edit tool to modify the image.

8. The method as recited in claim 5, further comprising:
   determining that the image score is less than a threshold image score; and
   locating an alternate image to replace the image.

9. The method as recited in claim 8, further comprising selecting the alternate image from an image database based at least in part on the alternate image having metadata corresponding the item description.

10. The method as recited in claim 8, further comprising selecting the alternate image from an image database based at least in part on the alternate image having visual attributes that correspond to the image above a threshold correspondence.

11. The method as recited in claim 5, wherein the set of scored images comprises:
    a first portion of images labeled as high quality; and
    a second portion of images labeled as low quality, wherein each image of the second portion of images is further labeled to include one or more reason codes associated with image quality labels.

12. The method as recited in claim 5, wherein the analyzing the set of scored images comprises training a machine learning model, using the set of scored images, to classify an image as high quality or low quality.

13. The method as recited in claim 5, further comprising surfacing the image among a set of images based at least in part on the image score.

14. A system comprising:
    one or more processors; and
    a memory that stores one or more computer-executable instructions that are executable by the one or more processors to cause the system to perform operations comprising:
       receiving an image and an item description from a user device;

performing image analysis of the image to determine a correlation between the image and the item description, the image analysis comprising:
extracting one or more visual features from the image;
identifying one or more objects depicted by the image based in part on the one or more visual features; and
determining the correlation between the one or more objects and the item description;
determining an image score for the image based at least in part on one or more composition rules and the correlation between the image and the item description;
determining a composition suggestion for the image based at least in part on the image analysis and the correlation between the image and the item description; and
associating the image score with the image.

15. The system as recited in claim 14, the operations further comprising:
receiving a set of labeled images, the set of labeled images comprising a first portion of images labeled as high quality, and a second portion of images labeled as low quality, and wherein each image of the second portion of images is further labeled to include one or more reason codes associated with image quality issues; and
training a machine learning model, using the set of labeled images, to classify an image quality.

16. The system as recited in claim 15, the operations further comprising analyzing the set of labeled images to learn at least one composition rule of the one or more composition rules.

17. The system as recited in claim 14, the operations further comprising surfacing the image among a set of images based at least in part on the image score.

18. The system as recited in claim 14, the operations further comprising providing, to the user device, the composition suggestion for the image.

19. The system as recited in claim 14, the operations further comprising:
determining that the image score is less than a threshold image score; and
selecting an alternate image to be used in place of the image.

20. The method as recited in claim 5, further comprising:
receiving feedback that the image score was incorrect; and
analyzing, based in part on the feedback, a second set of scored images to refine the one or more composition rules.

* * * * *